United States Patent
Neill et al.

(10) Patent No.: US 7,801,869 B2
(45) Date of Patent: Sep. 21, 2010

(54) PARTIAL REVOCATION LIST

(75) Inventors: Brian Neill, Burlington (CA); Ashok Vadekar, Rockwood (CA)

(73) Assignee: Certicom Corp., Mississauga (CA)

( * ) Notice: Subject to any disclaimer, the term of this patent is extended or adjusted under 35 U.S.C. 154(b) by 176 days.

(21) Appl. No.: 11/304,825

(22) Filed: Dec. 16, 2005

(65) Prior Publication Data

US 2006/0161571 A1 Jul. 20, 2006

Related U.S. Application Data

(60) Provisional application No. 60/637,756, filed on Dec. 22, 2004.

(51) Int. Cl.
*G06F 7/00* (2006.01)
*G06F 17/00* (2006.01)

(52) U.S. Cl. .......................... 707/695; 707/689; 713/158

(58) Field of Classification Search .................... None
See application file for complete search history.

(56) References Cited

U.S. PATENT DOCUMENTS

| 5,687,235 | A * | 11/1997 | Perlman et al. ............. 713/158 |
| 5,812,662 | A * | 9/1998 | Hsu et al. .................... 705/55 |
| 5,949,877 | A * | 9/1999 | Traw et al. .................. 713/171 |
| 6,850,914 | B1 * | 2/2005 | Harada et al. ............... 705/57 |
| 7,085,929 | B1 * | 8/2006 | Staring ....................... 713/168 |
| 2001/0021255 | A1 * | 9/2001 | Ishibashi .................... 380/277 |
| 2003/0046536 | A1 * | 3/2003 | Bruekers et al. ............ 713/158 |
| 2003/0065927 | A1 * | 4/2003 | Penner ........................ 713/189 |
| 2004/0128504 | A1 * | 7/2004 | Kivinen et al. .............. 713/158 |
| 2004/0162985 | A1 * | 8/2004 | Freeman et al. ............. 713/176 |
| 2004/0168056 | A1 * | 8/2004 | Dillaway et al. ............ 713/156 |
| 2004/0205345 | A1 * | 10/2004 | Ripley et al. ................ 713/176 |
| 2004/0210597 | A1 * | 10/2004 | Wanish ........................ 707/102 |
| 2005/0021942 | A1 * | 1/2005 | Diehl et al. .................. 713/158 |
| 2006/0062073 | A1 * | 3/2006 | Kitani et al. ................ 365/232 |
| 2006/0271492 | A1 * | 11/2006 | Candelore et al. ............. 705/57 |

FOREIGN PATENT DOCUMENTS

| EP | 0930556 | 7/1999 |
| WO | WO 01/11819 | 2/2001 |
| WO | WO0111819 A1 * | 2/2001 |
| WO | WO 2004/064060 A2 | 7/2004 |
| WO | WO 2004/097606 | 11/2004 |

OTHER PUBLICATIONS

U.S. Appl. No. 09/937,120, filed Nov. 14, 2002, Asano et al.

* cited by examiner

*Primary Examiner*—Pierre M Vital
*Assistant Examiner*—Augustine Obisesan
(74) *Attorney, Agent, or Firm*—Brett J. Slaney; John R. S. Orange; Blake, Cassels & Graydon LLP

(57) ABSTRACT

A partial revocation list and a system and method for using the partial revocation list for tracking the authenticity of replacement cartridges in a manufactured device to inhibit cloning of the cartridges is provided. A revocation pool is maintained by a manufacturer who chooses a partial revocation list from the revocation pool to store in the memory of the cartridge. The device stores its own revocation list, informs the manufacturer of cartridges which have been used and checks when a new device is installed to ensure a cloned replacement is not being used. The partial revocation list distributes enough revocation information to devices to statistically impair the cartridge yield of a cloning operation.

25 Claims, 2 Drawing Sheets

PARTIAL REVOCATION LIST

This application claims priority from U.S. Provisional Patent Application Ser. No. 60/637,756 filed on Dec. 22, 2004.

FIELD OF THE INVENTION

The present invention relates to systems and methods for tracking the authenticity of a portion of a product.

DESCRIPTION OF THE PRIOR ART

A common business model for selling certain devices is to initially sell the complete device or system at a price that is not beneficial to the seller and reclaim lost profits by supplying parts and services on the ongoing operation of the device following the initial sale. In such a business model, poor revenues on the sale are offset by price premiums on after-market parts and services, allowing customers to shift their costs from large start-up costs to slightly increased, ongoing operational costs.

Typically, replacement parts are not as complicated to manufacture as the complete device. The number of suppliers capable of producing the parts is larger than the number of suppliers that can produce the more complicated device in its entirety. Hence, generic parts manufacturers will sometimes enter the market and compete directly with the original manufacturer, thereby diminishing the price premiums. Anything that the original manufacturer does to reduce the pool of capable suppliers is sometimes referred to as a "barrier to market entry".

Fundamentally, this is not a problem, and is considered a natural part of economics and commerce. A problem does arise for manufactures of computer systems, or other devices that rely heavily on a computational core to their products. Often replacement portions or parts of a device, also known as "cartridges", require a replacement cost that reflects the initial investment made in the design and production of the product as opposed to simply the cost of the materials used in their manufacture. While the original suppliers can define and create the original content of a cartridge, a much larger group can take the cartridge and "clone" it. That is, they can avoid the costs associated with creating the inherent attributes on the cartridge such as its shape, strength, functionality, and focus solely on the material manufacture, thereby benefiting from the innovation of the original manufacturer, at a loss to the latter.

By way of example, the cartridge may contain ink for a printer or may be a disposable medical device. In either case, the benefit of the innovation is taken from the manufacturer by a generic part builder that reproduces the unsophisticated physical mechanism and clones the sophisticated and valuable data contained in the product simply by copying the product.

The provision of generic parts is also of concern where the parts are used in critical environments, such as a vehicle or operating plant. The replacement of a part with a counterfeit or remanufactured part that appears to be original may lead to premature failure.

Some original manufacturers attempt to combat this situation using a combination of unique numbering of the cartridges and cryptographic controls. Digitally signing unique serial numbers, and using a communication channel to disseminate used cartridge data is the ideal solution to ensure that a cartridge was legitimately produced by the manufacturer or licensed affiliate. The signature ensures the authenticity of the serial number and the network is used to ensure only one node, or device, will use a cartridge only once.

Unfortunately, an ideal communication channel for disseminating information associated with used cartridges to other devices is rare. An ideal channel must have some degree of guaranteed availability that cannot be blocked, either intentionally or unintentionally by the user.

The only channel which can reasonably be assumed to be guaranteed available is the one realized on the physical medium of new cartridges from the manufacturer. The manufacturer can store a list of previously-employed serial numbers on a memory device on each new cartridge along with any operational data required. This list is essentially a revocation list that can be transferred to and stored on the device.

In practice, it is highly unlikely that the cartridge will contain enough space to maintain an ever-increasing revocation list. Eventually, available space on the cartridge will run out and serial numbers of cloned cartridges will not be stored. Therefore a limitation of bandwidth on the communication channel inhibits the use of a complete revocation list.

It is therefore an object of the present invention to obviate or mitigate the above-mentioned disadvantages.

SUMMARY OF THE INVENTION

In one aspect, a method is provided for monitoring replaceable portions of a device, the replaceable portions each having a unique identifier associated therewith. The method comprises the steps of storing on a new portion, a partial list of the identifiers, the partial list being chosen from a master list of the identifiers; upon installation of the new portion, the device using the contents of the partial list to update a locally stored list of identifiers; and the device comparing the identifier associated with the new portion with the locally stored list, and rejecting the installation if the identifier associated with the new portion is found.

In another aspect, a system is provided for monitoring replaceable portions of a device, the replaceable portions each having a unique identifier associated therewith. The system comprises a master list of the identifiers; and a partial list of the identifiers to be stored on a new portion, the partial list being chosen from the master list; wherein the contents of the partial list is used by the device upon installation of the new portion to update a locally stored list of identifiers and to compare the identifier associated with the new portion with the locally stored list, whereby the installation is rejected if the identifier associated with the new portion is found.

In yet another aspect, a partial revocation list is provided for use in monitoring replaceable portions of a device, and for storing on a new portion to be installed in the device, the replaceable portions each having a unique identifier associated therewith. The revocation list comprises a partial list of identifiers chosen from a master list; wherein the contents of the partial list is used by the device upon installation of the new portion to update a locally stored list of identifiers and to compare the identifier associated with the new portion with the locally stored list, whereby the installation is rejected if the identifier associated with the new portion is found.

BRIEF DESCRIPTION OF THE DRAWINGS

An embodiment of the invention will now be described by way of example only with reference to the appended drawings wherein.

DETAILED DESCRIPTION OF THE INVENTION

Figure 1:
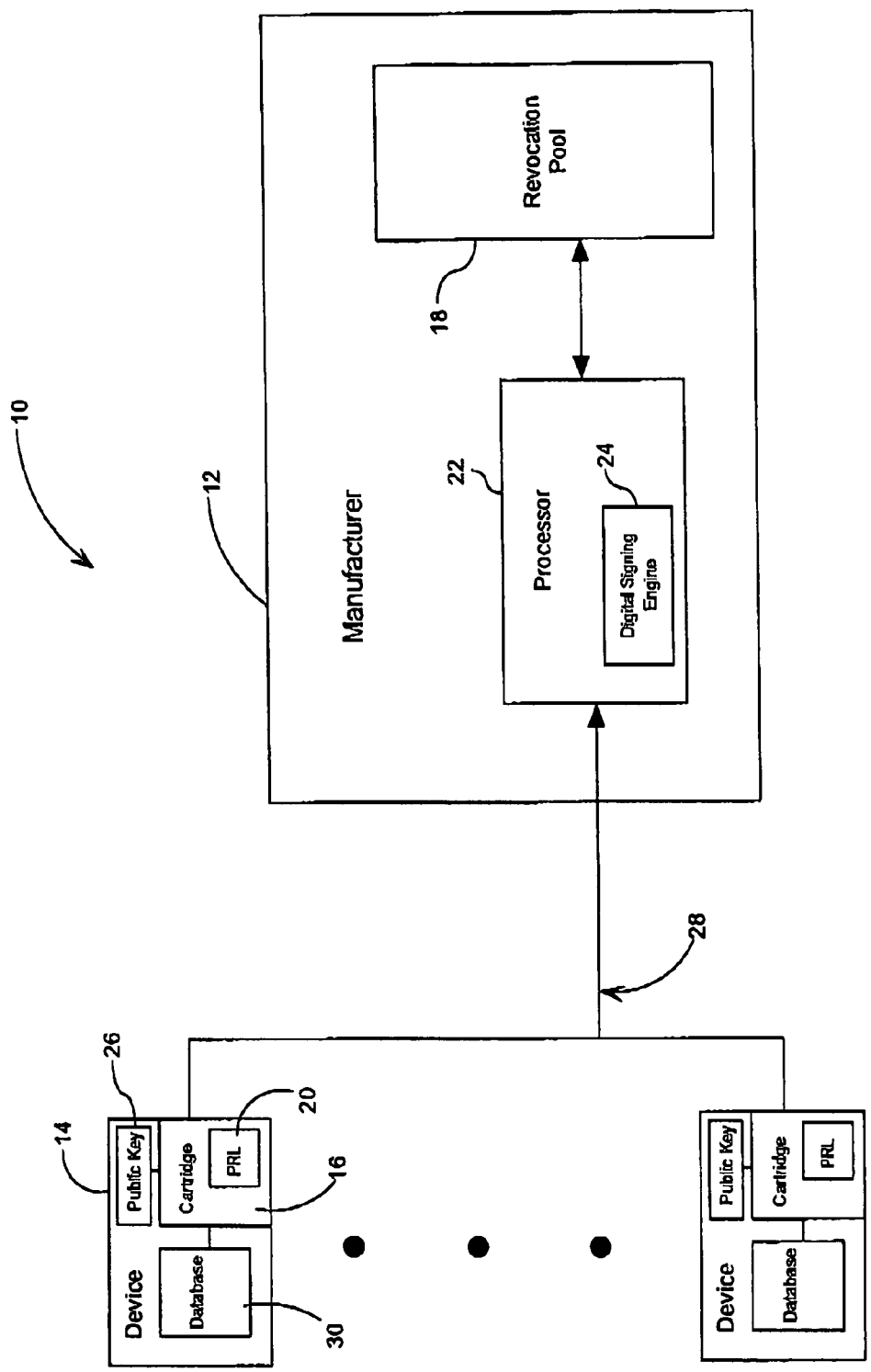
FIG. 1 is a schematic representation of a system incorporating a partial revocation list.

Referring therefore to FIG. 1, a partial revocation communication system is generally denoted by numeral 10. A manufacturer 12 produces a device 14 which has a replaceable portion referred to hereinafter as a cartridge 16. The cartridge 16 is a replaceable portion of the device 14 specifically designed to cooperate with the device 14 and by its nature can be replicated or "cloned" by an outside manufacturer. Each of the cartridges has a serial number or identifier and the manufacturer 12 maintains a master list/database of serial numbers belonging to cartridges that are known to have been used or compromised, referred to hereinafter as a revocation pool 18.

The revocation pool 18 may be generated from serial numbers, and can act as a memory device for storing information related to cartridges 16 that are known to be actively cloned by an outside manufacturer. The list may also include serial numbers from cartridges 16 manufactured prior to a past date representing the typical shelf life of the original product. In this way, the revocation list may contain identifiers of cartridges that are most likely to be cloned or recycled.

Each cartridge 16 produced by the manufacturer 12 has a partial revocation list (PRL) 20 that is created from a selection of serial numbers from the list stored in the revocation pool 18, and is stored on a memory device thereof. The content of PRL 20 may vary from one cartridge to another and offers flexibility to meet particular demands. Each cartridge 16 produced can have a PRL 20 that contains a completely different data set (i.e. each PRL 20 on a new cartridge 16 revokes a different set of used or compromised cartridges).

The contents of the PRL are determined by the manufacturer 12 who has a processor 22 for selecting a list of serial numbers from the revocation pool 18 to create the PRL 20. The processor incorporates a digital signing engine 24 used by the processor 22 for digitally signing the PRL 20 when it is created. The processor 22 is any device capable of computation. The digital signature is used to protect the information contained in the PRL 20 and can be verified using a public key 26 embedded on each of the devices 14. The public key 26 is embedded in all devices 14 so that any device 14 may validate a PRL 20 from the manufacturer 12.

The device 14 also maintains a local database 30. The database 30 contains a list of serial numbers from cartridges 16 which have been used for the device 14 and a list of revoked serial numbers which is updated using the PRL 20 of a newly installed cartridge 16.

The communication channel 28 connects the devices 16 to the manufacturer 12. In a preferred arrangement, the communication channel 28 is a trusted channel, and may be referred to as a "trusted back-channel". Such a trusted channel allows the devices to securely communicate used cartridge 16 data back to the manufacturer 12. In this preferred arrangement, the term "trusted" indicates that means have been employed by the system 10 to prevent an outside manufacturer (e.g. cloning operation) from hijacking the channel for the purposes of filtering used cartridge information, and thus hide a cloning operation. The communication channel 28 may be implemented manually using physical collection and delivery of the data but may also be done electronically with trusted hardware using an untrusted communication channel.

Figure 2:
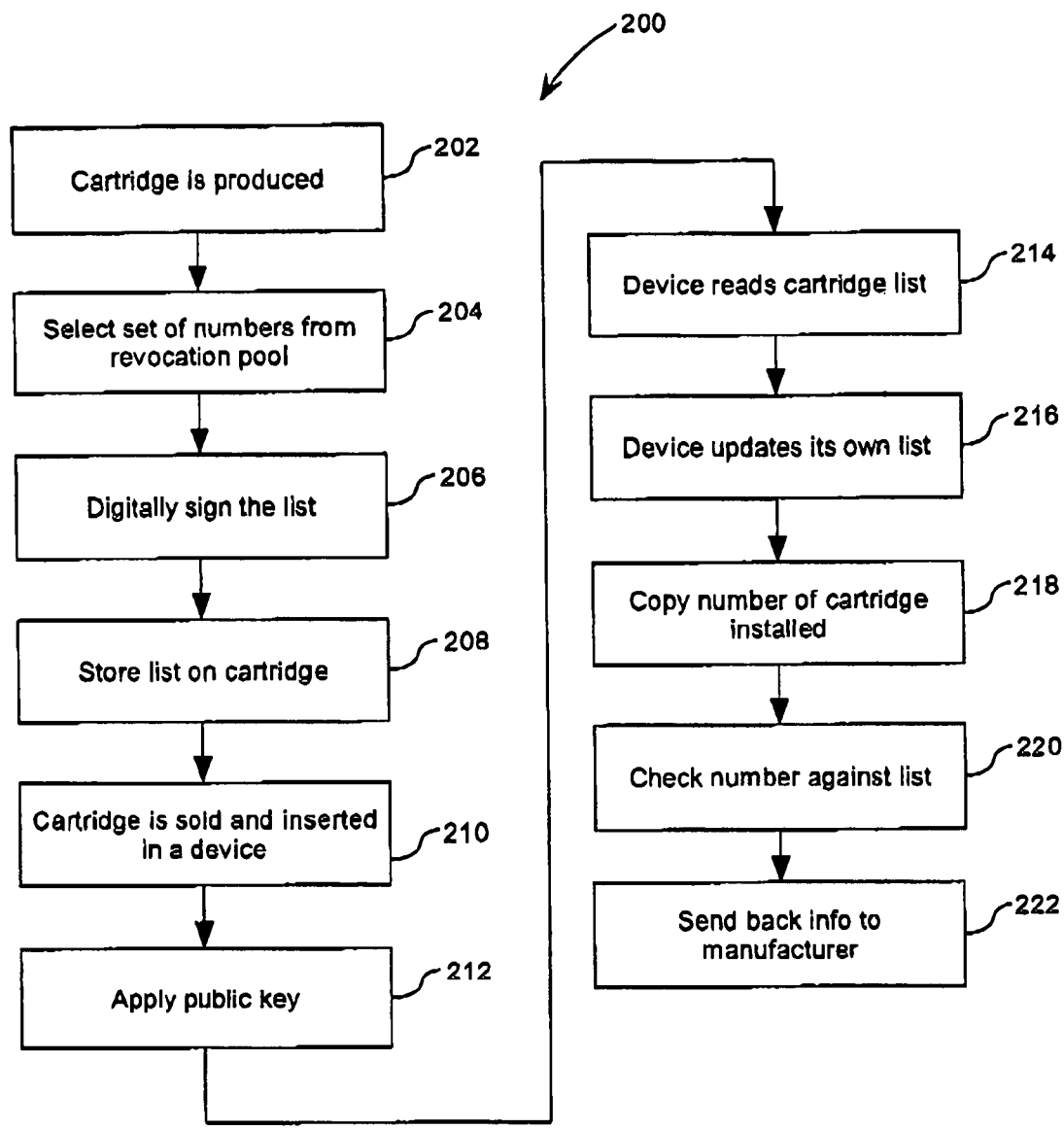
FIG. 2 is a flow chart showing the steps in a procedure for distributing and updating a partial revocation list.

To illustrate a method for utilizing a PRL 20, a distribution and updating procedure 200 is shown in FIG. 2. A cartridge 16 is produced by the manufacturer 12 at step 202. When the cartridge 16 is produced, a PRL 20 is created at step 204. The PRL 20 is created by selecting a set of serial numbers from the revocation pool 18. The choice of which serial numbers are placed in the PRL 20 is preferably based on random selection, with weighting. A manufacturer 12 is able to weight a particular selection, to improve the probability that the selection will be included in the PRL 20. A selection can represent any individual used cartridge 16 or a range of used cartridges, identified by a wild card or logic statement. A manufacturer 12 has complete control of what cartridge identifiers, if any, are present in the revocation pool 18 at any given time.

For example, a "selection" may be defined to be the tuple (serial number, weight) or (serial number range, weight), where the weight is a value between 1 and 10. For example, if a manufacturer's revocation pool 18 were to contain three such tuples, namely A=(1,1), B=(2,1) and C=(3<serial number<10, 2), and if a PRL 20 were to be populated with one selection from the pool 18, then the revocation pool 18 from which to choose, due to the weightings, would effectively be A, B, C, C, since C has a weighting of two (2). In such an example, a random selection of 100 PRLs from this particular pool would produce a PRL 20 consisting of the serial number 1 with a 25% probability, the serial number 2 with a 25% probability and the range of serial numbers from 3 to 10 with a 50% probability.

Once the PRL 20 is created, it may be signed at step 206 and then stored in non-volatile memory on the cartridge 16 at step 208. Tampering with the signed cartridge data by the customer, such as attempting to alter or strip the PRL 20 from the cartridge 16 would invalidate the digital signature. If the digital signature is invalidated, then the authenticity of the cartridge can not be verified by the device 14 because an unaltered PRL 20 would be needed to validate the digital signature.

If simply signing the PRL 20 is not sufficient, it may be combined with the serial number and then signed so that the PRL 20 can not be stripped off. The PRL 20 is associated with a particular cartridge 16, and as a result, the manufacturer 12 may encourage delivery of the PRL 20 within its respective cartridge 16, since the PRL 20 and cartridge are preferably bound together by the digital signature. Although this does not prevent the outside manufacturer from copying the serial number along with the PRL 20 and mass producing one copy, it does allow the manufacturer 12 to deal with the issue of future cartridges 16 being employed based on a reused PRL. This implies a high cartridge turnover using one-time use cartridges. Manufacturers 12 in markets such as those for printer cartridges and medical instruments with one-time use would benefit from the coupling of the important data and the PRL 20.

Any device 14 incorporating a replaceable cartridge 16 which can be readily cloned by an outside manufacturer is suitable for integrating a PRL 20 into the memory of the cartridge 16. At a time when a replacement cartridge 16 is needed to continue operation of the device 14, a replacement cartridge 16 is sold to the owner of the device 14 and inserted into the device 14 at step 210.

At the time of installation it would be preferable for the device 14 to validate the PRL 20 of the cartridge 16 using the public key 26 embedded in the device 14 as indicated in step 212. The use of the public key 26 is an optional step depending on whether or not a digital signature is used and may be done at anytime during the procedure 200 once the cartridge 16 has been installed. It is then preferable that the device 14 recognize that a new cartridge 16 has been inserted and reads the new cartridge's PRL 20 as indicated in step 214. The device will then update its list of revoked serial numbers 216 stored in its database 30 with the list of revoked serial numbers on the PRL 20.

The device 14 will then copy the serial number of the cartridge 16 being installed into its locally stored list of used serial numbers contained in its database 30 as indicated in step 218. This number is checked against both the used and revoked cartridge lists in the database 30 to ensure that the cartridge 16 being installed does not have a serial number that has been revoked or previously used at step 220. It is the device's responsibility to perform these checks and to not accept a cartridge having a previously used or revoked serial number. Thus, the operation of the device is inhibited.

In using the PRL 20, the goal is to distribute enough revocation information to the devices 14 using the replacement cartridges 16 to statistically impair the cartridge yield of an outside manufacturer who may try to clone the cartridges 16. Therefore a cloning operation may fail to deliver a working cartridge to a customer some percentage of the time. An intelligent selection process for choosing the members of the PRL 20 from the revocation pool 18 based on, e.g., a weighted selection process as outlined above, increases the likelihood that cloned cartridges will be rejected.

Preferably, a PRL 20 is intended to be used when a forward channel from the manufacturer 12 to the device 14 does not exist or is unreliable. In this case, the manufacture 12 can only guarantee to get revocation data to a device 14 if it is sent with the cartridges 16 that are required for continued operation. This will occur for example when genuine cartridges are inter mingled with cloned or recycled cartridges in the supply chain so there is a reasonable likelihood that a cartridge with an updated PRL will be installed on the device 14. The PRL 20 is preferably bound with the important data on the cartridge 16 using a digital signature so that the customer may be forced to accept and forward to the device 14, both the data and the PRL 20 on the cartridge 16.

Mass-produced cartridges 16 will most likely have an upper bound on memory, therefore sending a complete list, while preferable from a security perspective, is not possible as the list grows in size. If the entire list cannot be sent, pieces of the list can be sent to different customers so that an outside manufacturer can not be sure what cloned cartridges will work for which customers. As a result, the outside manufacture will generally have reduced yields, a less reliable product, and higher distribution costs than the manufacturer 12.

The device 14 will preferably send back an updated list of the cartridge serial numbers used by the device 14 through the communication channel 28 upon successful installation of the new cartridge 16 to the manufacturer 12 as indicated in step 222. This will enable the processor 20 to continually update the revocation pool 18 for the future generations of PRLs. It will be appreciated that step 222 as exemplified is only a preferable mechanism to determine when a cartridge 16 is used. For example, the cartridges 16 may instead employ an expiry date.

Although the invention has been described with reference to certain specific embodiments, various modifications thereof will be apparent to those skilled in the art without departing from the spirit and scope of the invention as outlined in the claims appended hereto.

What is claimed is:

1. A method for monitoring replaceable portions of a device, said replaceable portions each having a unique identifier associated therewith, said method comprising:

said device obtaining from a new portion, a partial list of unique identifiers stored thereon, said partial list having been chosen from a master list of unique identifiers at random, wherein each of said identifiers in said master list is given a weight, and wherein said weight dictates the likelihood of said identifier being chosen from said master list, said partial list having been combined with a unique identifier associated with said new portion and digitally signed to generate a digital signature binding said partial list to said new portion, said digital signature being stored on said new portion;

said device obtaining said digital signature from said new portion and verifying said digital signature; and if said digital signature is verified, said device comparing said unique identifier associated with said new portion with a locally stored list of identifiers and said partial list and rejecting incorporation of said new portion if said unique identifier associated with said new portion is found.

2. A method according to claim 1 further comprising the step of said device providing an updated list of identifiers to another entity responsible for maintaining said master list of identifiers to update said master list.

3. A method according to claim 1 further comprising said device using a locally stored public key to verify said digital signature of said combination.

4. A method according to claim 1 wherein said weight indicates the number of times a particular identifier is included in said master list.

5. A method according to claim 1 wherein said partial list is stored in a non-volatile memory of said new portion.

6. A system for monitoring replaceable portions of a device, said replaceable portions each having a unique identifier associated therewith, said system comprising:

a first interface configured to obtain from a new portion to be incorporated into said device, a partial list of unique identifiers stored thereon, said partial list having been chosen from a master list of unique identifiers, wherein each of said identifiers in said master list is given a weight, and wherein said weight dictates the likelihood of said identifier being chosen from said master list, said partial list having been combined with a unique identifier associated with said new portion and digitally signed to generate a digital signature binding said partial list to said new portion, said digital signature being stored on said new portion;

a storage device for storing a local list of identifiers; and a computing device configured to obtain said digital signature from said new portion and verify said digital signature, if said digital signature is verified, to compare said unique identifier associated with said new portion with said local list of identifiers and said partial list, and to reject incorporation of said new portion if said identifier associated with said new portion is found.

7. A system according to claim 6 wherein said master list is stored by another entity responsible for maintaining said master list of identifiers and said system further comprises a second interface configured to provide an updated list of identifiers to said another entity to enable said master list to be updated.

8. A system according to claim 7 further comprising a communication channel between said device and said another entity, wherein said updated list is provided by said device over said communication channel.

9. A system according to claim 6 wherein said storage device comprises non-volatile memory and said partial list is stored in said non-volatile memory.

10. A system according to claim 6 wherein said storage device has a public key for verifying said digital signature on said combination.

11. A system according to claim 6 wherein said weight indicates the number of times a particular identifier is included in said master list.

12. A method for monitoring replaceable portions of a device, said replaceable portions each having a unique identifier associated therewith, said method comprising the steps of:
- choosing at random from a master list of unique identifiers, a partial list of unique identifiers for a new portion, wherein each said identifiers in said master list is given a weight, and wherein said weight dictates the likelihood of said identifier being chosen from said master list;
- digitally signing a combination of said partial list of identifiers and a unique identifier associated with said new portion to generate a digital signature binding said partial list to said new portion; and
- storing said partial list and said digital signature on said new portion;
- wherein if said digital signature can be verified, said device can compare said unique identifier associated with said new portion with a locally stored list of identifiers and said partial list and reject incorporation of said new portion if said unique identifier associated with said new portion is found.

13. A method according to claim 12 further comprising the step of receiving from said device an updated list of identifiers and updating said master list.

14. A method according to claim 12 further comprising providing a public key to be locally stored on said device to verify said digital signature on said combination.

15. A method according to claim 12 wherein said weight indicates the number of times a particular identifier is included in said master list.

16. A method according to claim 12 wherein said partial list is stored in a non-volatile memory of said new portion.

17. A system for monitoring replaceable portions of a device, said replaceable portions each having a unique identifier associated therewith, said system comprising:
- a storage device for storing a master list of unique identifiers;
- a computing device for selecting at random a partial list of unique identifiers from said master list for a new portion, wherein each said identifiers in said master list is given a weight, and wherein said weight dictates the likelihood of said identifier being chosen from said master list, for digitally signing a combination of said partial list of identifiers and a unique identifier associated with said new portion to generate a digital signature binding said partial list to said new portion, and for storing said partial list and said digital signature on said new portion; wherein if said digital signature can be verified, said device can compare said unique identifier associated with said new portion with a locally stored list of identifiers and said partial list and reject incorporation of said new portion if said unique identifier associated with said new portion is found.

18. A system according to claim 17 wherein said computing device is further configured to comprise a first interface for receiving from said device, an updated list of identifiers and updating said master list.

19. A system according to claim 18 comprising a trusted back channel connected to said first interface and accessible to said device.

20. A system according to claim 17 wherein said computing device is further configured to provide a public key to be locally stored on said device to verify said digital signature on said combination.

21. A system according to claim 17 wherein said weight indicates the number of times a particular identifier is included in said master list.

22. A system according to claim 17 wherein said partial list is stored in a non-volatile memory of said new portion.

23. A system according to claim 17 being incorporated into a manufacturing facility of said device.

24. A computer readable medium comprising computer executable instructions thereon for monitoring replaceable portions of a device, said computer readable medium including instructions for:
- obtaining from a new portion, a partial list of unique identifiers stored thereon, said partial list having been chosen from a master list of unique identifiers at random, wherein each of said identifiers in said master list is given a weight, and wherein said weight dictates the likelihood of said identifier being chosen from said master list, said partial list having been combined with a unique identifier associated with said new portion and digitally signed to generate a digital signature binding said partial list to said new portion, said digital signature being stored on said new portion;
- said device obtaining said digital signature from said new portion and verifying said digital signature; and
- if said digital signature is verified, said device comparing said unique identifier associated with said new portion with a locally stored list of identifiers and said partial list and rejecting incorporation of said new portion if said unique identifier associated with said new portion is found.

25. A computer readable medium comprising computer executable instructions thereon for monitoring replaceable portions of a device, said computer readable medium including instructions for:
- choosing at random from a master list of unique identifiers, a partial list of unique identifiers for a new portion, wherein each said identifiers in said master list is given a weight, and wherein said weight dictates the likelihood of said identifier being chosen from said master list;
- digitally signing a combination of said partial list of identifiers and a unique identifier associated with said new portion to generate a digital signature binding said partial list to said new portion; and
- storing said partial list and said digital signature on said new portion;
- wherein if said digital signature can be verified, said device can compare said unique identifier associated with said new portion with a locally stored list of identifiers and said partial list and reject incorporation of said new portion if said unique identifier associated with said new portion is found.

* * * * *